(12) United States Patent
Anderson

(10) Patent No.: US 7,634,817 B2
(45) Date of Patent: Dec. 15, 2009

(54) DIAGNOSTIC AUTHENTICATION CODES

(75) Inventor: Glen J. Anderson, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 1241 days.

(21) Appl. No.: 10/624,857

(22) Filed: Jul. 22, 2003

(65) Prior Publication Data
US 2005/0021974 A1    Jan. 27, 2005

(51) Int. Cl.
*G06F 11/00* (2006.01)
*G06F 17/30* (2006.01)

(52) U.S. Cl. .............................. 726/30; 726/27; 726/26
(58) Field of Classification Search .................. 726/30, 726/26–27, 28–29
See application file for complete search history.

(56) References Cited

U.S. PATENT DOCUMENTS

| | | | |
|---|---|---|---|
| 5,984,508 A | | 11/1999 | Hurley |
| 6,249,755 B1 | | 6/2001 | Yemini et al. |
| 6,356,859 B1 | | 3/2002 | Talbot et al. |
| 7,076,541 B1 | * | 7/2006 | Burstein et al. ................. 707/3 |
| 2004/0210797 A1 | * | 10/2004 | Kimelman et al. ............. 714/25 |
| 2006/0116208 A1 | * | 6/2006 | Chen et al. ..................... 463/43 |
| 2007/0011676 A1 | * | 1/2007 | Sahita et al. ................. 718/100 |

OTHER PUBLICATIONS

Printout page for http://www.reed-electronics.com/semiconductor/article/CA231640.*
Efficient In-Vehicle Delayed Data Authentication Based on Compound Message Authentication Codes Nilsson, D.K.; Larson, U.E.; Jonsson, E.; Vehicular Technology Conference, 2008. VTC 2008-Fall. IEEE 68th Sep. 21-24, 2008 pp. 1-5.*
Security for Industrial Communication Systems; Dzung, D.; Naedele, M.; Von Hoff, T.P.; Crevatin, M.; Proceedings of the IEEE vol. 93, Issue 6, Jun. 2005 pp. 1152-1177.*
Internet Firewalls in the DECOS System-on-a-Chip Architecture; Wasicek, A.; Elmenreich, W.; Industrial Informatics, 2007 5th IEEE International Conference on vol. 2, Jun. 23-27, 2007 pp. 983-988.*

* cited by examiner

*Primary Examiner*—David Y Jung
(74) *Attorney, Agent, or Firm*—Pearne & Gordon LLP

(57) ABSTRACT

An authentication code for a diagnostic code is generated. In one aspect, the authentication code includes a timestamp indicating when the diagnostic generating the diagnostic code was run. In a further aspect, the authentication code includes a serial number for a computer system running the diagnostic. In a still further aspect, the authentication code includes a serial number for a component being diagnosed. The authentication code may be generated on the system being diagnosed, or it may be obtained from a server communicably coupled to the system being diagnosed. Additionally, the diagnostic code may be obtained from a file residing on the computer system begin diagnosed, or on a server.

29 Claims, 4 Drawing Sheets

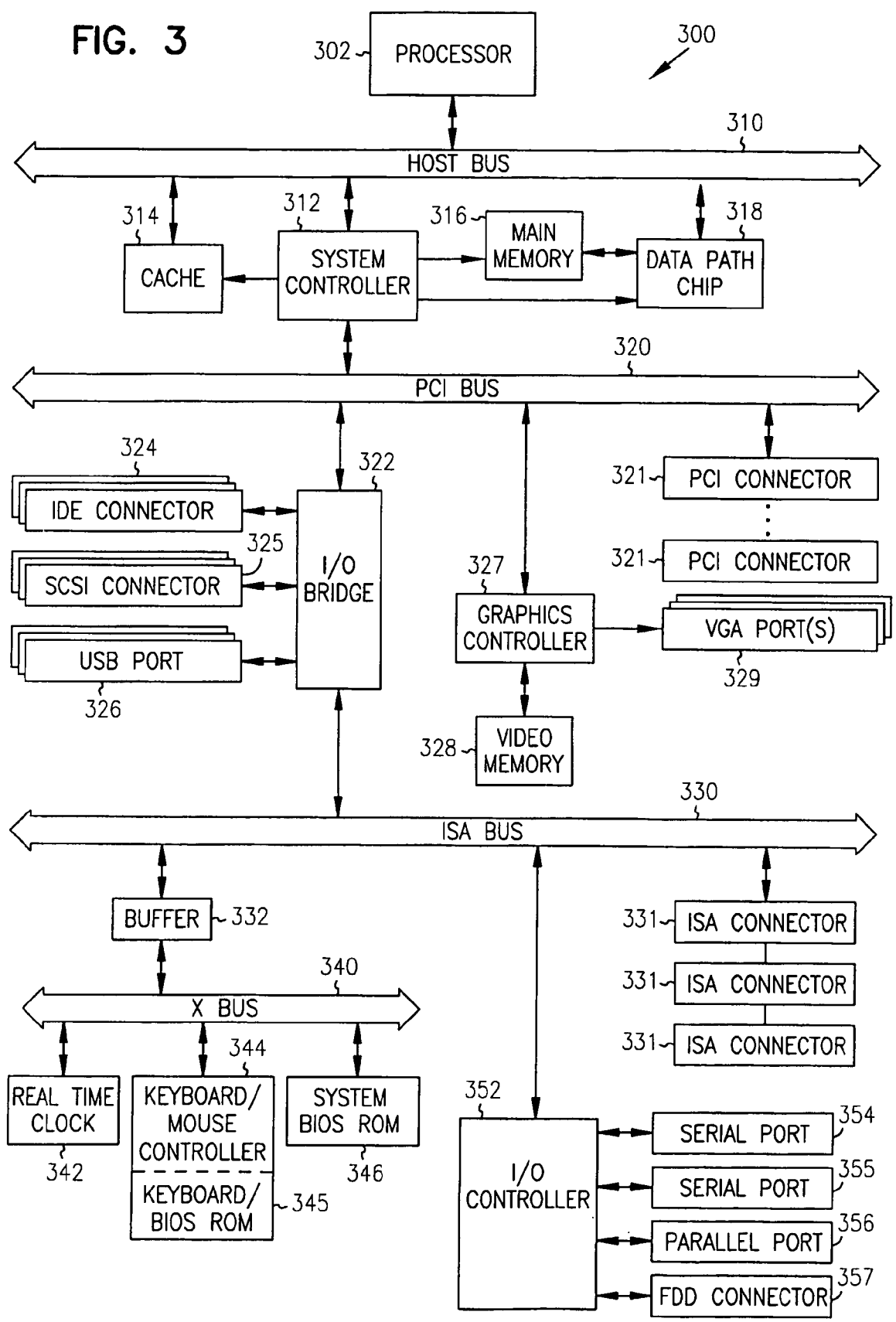

DIAGNOSTIC AUTHENTICATION CODES

FIELD OF THE INVENTION

The present invention relates to systems and methods for providing diagnostic codes on computerized systems, and in particular to authentication of such diagnostic codes.

BACKGROUND OF THE INVENTION

Many vendors of computer hardware and software provide support for returning components that are suspected of being defective. Unfortunately, it can be difficult to properly identify a defective component. As a result, it is often the case that non-defective components are returned. This results in significant costs for the vendor because the vendor must ship the non-defective component back to the customer, or they may have already shipped a replacement component under warranty when in fact the original part was not defective. In order to reduce the return of non-defective components, a vendor may require a diagnostic code before a return will be accepted.

In order to obtain a diagnostic code, the customer may run diagnostic software themselves, or call a vendor's technical support representative to receive help in identifying a problem component. Diagnostic software can be an aid in identifying defective parts, but such diagnostic software must be used properly. Diagnostic software can take a long time to run due to the number of components that must be tested. Keeping a customer on the phone while the diagnostic program runs, while necessary, may irritate the customer. In addition, waiting for the diagnostic program to run may have an impact on the technical support representative's apparent productivity, as they cannot deal with other customers while waiting. As a result, there is a temptation for a vendor's technical support representative to guess at what might be failing rather than waiting for the diagnostic program to run its course. The technical support representative may then provide a known, perhaps previously used, valid diagnostic code that supports the representative's guess, without waiting for, or even running, the diagnostic software. Thus while the customer's wait time may be reduced, there can still be a significant number of unnecessary returns of non-defective components when the representative's guess is wrong.

As a result, there is a need in the art for the present invention.

SUMMARY OF THE INVENTION

The present invention includes systems and methods that generate an authentication code for a diagnostic code. In one aspect, the authentication code includes a timestamp indicating when the diagnostic generating the diagnostic code was run. In a further aspect, the authentication code includes a serial number for a computer system running the diagnostic. In a still further aspect, the authentication code includes a serial number for a component being diagnosed. The authentication code may be generated on the system being diagnosed, or it may be obtained from a server communicably coupled to the system being diagnosed. Additionally, the diagnostic code may be obtained from a file residing on the computer system being diagnosed, or on a server.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 3 is a block diagram of an example computer for implementing certain aspects of the present invention.

DETAILED DESCRIPTION OF THE INVENTION

Figure 1:
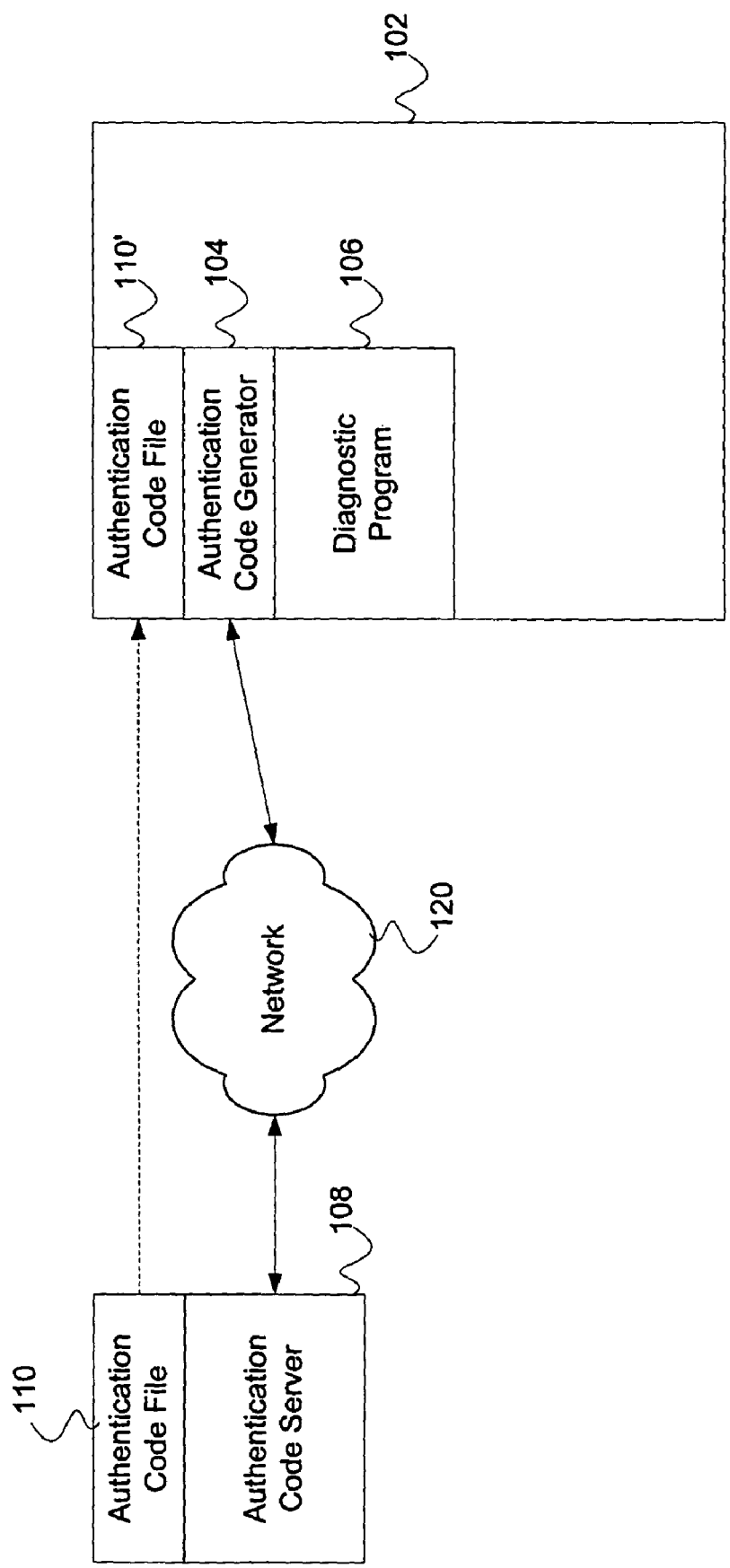
FIG. 1 is a block diagram illustrating an operating environment that includes systems according to an embodiment of the invention for generating an authentication code to accompany a diagnostic code.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The functions or algorithms described herein are implemented in software, human, or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software may be executed on a digital signal processor, ASIC, microprocessor, or other type of processor operating on a computer system, such as a personal computer, server or other computer system.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

FIG. 1 is a block diagram illustrating an exemplary environment in which systems incorporating embodiments of the invention may be practiced. In some embodiments, the exemplary environment includes a computer system 102, wherein the computer system includes at least one diagnostic program 106, and an authentication code generator 104. In alternative embodiments of the invention, the exemplary environment includes an authentication code server 108 communicably coupled to computer system 102 through a network 120.

Computer system 102 may be any type of computer system, including personal computers, laptop computers, palmtop computers, server computers, mainframe computers, workstations, personal digital assistants, cellular telephones or any other type of device having a processor capable of executing software. The invention is not limited to any particular type of computer system. The various components of an exemplary computer system are described in detail below with reference to FIG. 3.

In some embodiments, diagnostic program 106 operates to perform diagnostics on a hardware or software component of computer 102. Diagnostic program 106 may perform the diagnostic itself, or it may cause the component to perform a self-diagnostic. Typically the diagnostic program will generate a diagnostic code, or will receive a diagnostic code from a self-diagnostic module. In some embodiments, diagnostic program 106 is the PC-Doctor diagnostic program from PC-Doctor, Inc. of Emeryville, Calif. However, the invention is not limited to any particular type of diagnostic program.

In some embodiments, authentication code generator 104 comprises a software module operable to generate an authentication code after diagnostic program 106 produces a diagnostic code. Authentication code generator 104 may be a separate program from diagnostic program 106, or it may be a component of diagnostic program 106. For example, in some embodiments, authentication code generator 104 may be dynamically linked with diagnostic program 106.

Various embodiments of the invention employ varying mechanisms for generating an authentication code. In some embodiments of the invention, the authentication code is obtained from an authentication code server 108 communicably coupled to computer 102 via network 120. Network 120 may be any type of wired or wireless network supporting communications between computers. In some embodiments of the invention, network 120 is the Internet. In alternative embodiments, network 120 comprises a private network such as a corporate intranet. The invention is not limited to any particular type of network.

In alternative embodiments of the invention, authentication code server 108 maintains an authentication code file 110 containing valid authentication codes. The file may associate authentication codes to a date and/or time. When a computer system 102 requests an authentication code, server 108 in some embodiments performs a lookup based on the current date and/or time and returns the proper authentication code.

In further alternative embodiments of the invention, authentication code server 108 generates an authentication code by encoding the current date and/or time into an authentication code that is transmitted to authentication code generator 104 of computer system 102.

In some embodiments of the invention, authentication code file 110' resides on computer system 102. In some embodiments, authentication code file 110' may be a copy of authentication code file 110 that may be downloaded from authentication code server 108. In alternative embodiments, authentication code file 110' may be provided as part of a diagnostic software package that is shipped with computer system 102, or subsequently purchased for installation on computer system 102.

Further details on the operation of the above-described system will be provided below in the methods section.

Methods

Figure 2C:
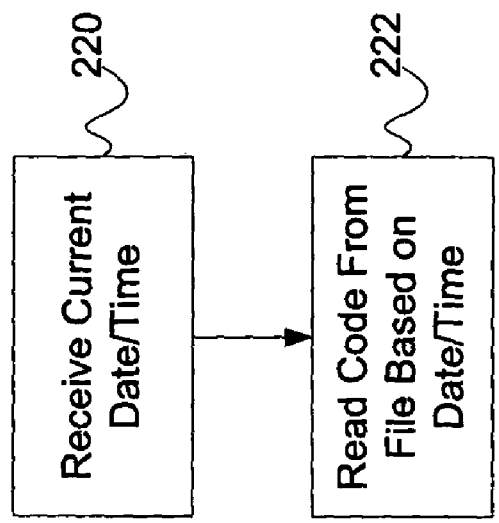
FIGS. 2A-C are flowcharts illustrating methods according to various embodiments of the invention for generating an authentication code to accompany a diagnostic code.
Figure 2A:
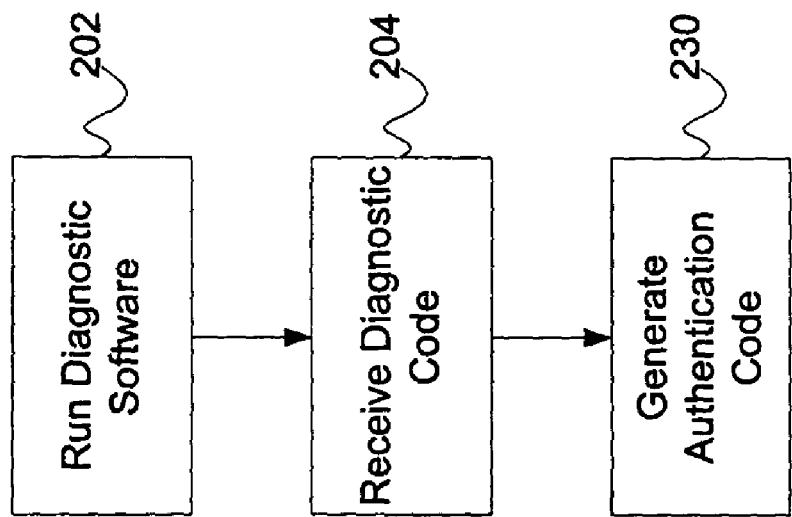
Figure 2B:
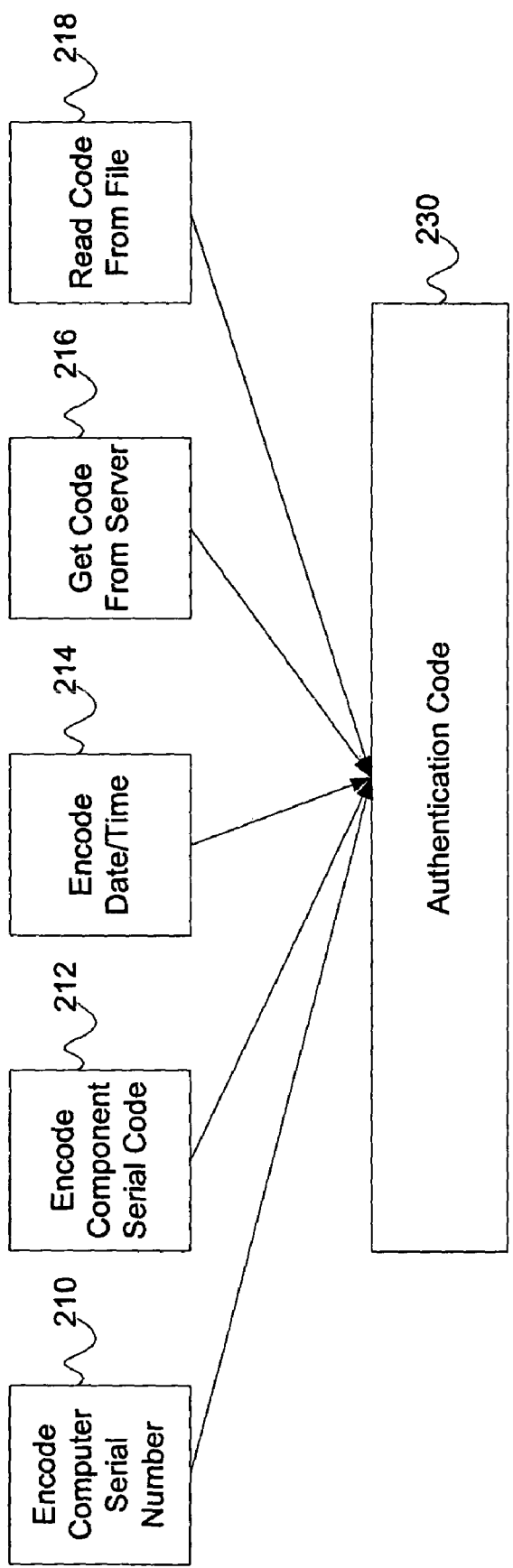

FIGS. 2A-2C are flowcharts illustrating methods according to various embodiments of the invention for generating an authentication code to accompany a diagnostic code. The methods to be performed by the constitute computer programs made up of computer-executable instructions. The computer-executable instructions may be read from a variety of computer-readable media, including but not limited to hard drives, floppy drives CD-ROMs, DVD-ROMs and signals transmitted over a wired or wireless network media. Describing the methods by reference to flowcharts enables one skilled in the art to develop such programs including such instructions to carry out the methods on suitable computers (the processor or processors of the computer executing the instructions from computer-readable media). The methods illustrated in FIGS. 2A-2C are inclusive of acts that may be taken by an operating environment executing an exemplary embodiment of the invention.

In some embodiments, the method begins when diagnostic software is run (block 202). As noted above, the diagnostic software may be a hardware diagnostic, a software diagnostic or a combination of the two. Further, the diagnostic software may be initiated by a computer user, a customer support representative, or it may be automatically initiated. Further, the diagnostic software may be executed by the processor of the computer system, or it may be executed by an individual hardware component of the computer system. In some embodiments of the invention, the diagnostic software is the PC-Doctor diagnostic software.

The diagnostic software will typically generate a diagnostic code (block 204). The diagnostic code may provide an indication as to which component of a hardware/software system is faulty, and may also provide an indication of the type of fault.

Next, the system generates an authentication code (block 230). The authentication code may be used to indicate that the diagnostic software was actually executed and produced the diagnostic code at block 204.

FIG. 2B is a flowchart illustrating methods according to varying embodiments of the invention for generating the authentication code at block 230 discussed above. Blocks 210, 212, 214, 216 and 218 indicate activities that may occur in any order and may occur in parallel with one another, and are thus shown at the same level in the flowchart. Further, the activities in blocks 210, 212, 214, 216 and 218 may occur in any combination of one or more of the activities in the varying embodiments of the invention. In the discussion below, the term 'encode' is used to indicate any method of embedding information into an authentication code. Typically the encoding process will obscure the information being encoded from a user or technical support representative in order to make it more difficult to reverse engineer the encoded information. That is, the authentication code is encoded or otherwise provided in a manner intended to ensure that the associated diagnostic code stems from running a diagnostic program on a particular computer (or other equipment or software), and was not created or copied by a customer representative, technician or by the customer. As such, the customer representative, technician or by the customer does not have the capability to generate authentication codes, other than by running the proper diagnostic program or routines, since the authentication codes are encoded. One example of such encoding is encryption. However, the invention is not limited to any particular encoding mechanism.

In some embodiments, a serial number for computer system 102 is encoded into an authentication code (block 210). Methods of obtaining a serial number for a computer system are known in the art.

In alternative embodiments of the invention, a serial number for a component of computer system 102 is encoded into an authentication code (block 212). The component may be a software component, or it may be a hardware component such as a hard drive, floppy drive, CD-ROM, DVD-ROM, tape unit, memory module, network interface etc. Examples of such components are provided below with reference to FIG. 3. The present invention is not limited to any particular type of hardware or software component.

In further alternative embodiments of the invention, a current date and/or time are encoded into the authentication code (block 214).

In still further alternative embodiments of the invention, the authentication code is obtained from an authentication code server (block 216). The authentication server may use the methods described herein to generate an authentication code prior to transmitting the code.

In yet further alternative embodiments of the invention, the authentication code is read from a file of authentication codes (block 218).

As noted above, varying combinations of encoding methods may be used to create an authentication code. For example, the tasks listed at blocks 210, 212, and 214 could all be performed resulting in an authentication code that contained a component serial number, a computer system serial code, and the date/time the authentication code was generated.

FIG. 2C is a flowchart providing further details of block 218 regarding embodiments where at least part of an authentication code is determined from a file of authentication codes. The method begins by determining the current date and/or time (block 220). The current date/time value may then be used to perform a lookup of a valid authentication code from a authentication code file (block 222). In some embodiments of the invention, the authentication code file includes a plurality of authentication codes and for each code a date and/or time that the authentication code is valid. The system executing the method scans the file for a date and/or time matching the current date and/or time, and returns the corresponding authentication code.

In alternative embodiments of the invention, the authentication code file includes a plurality of authentication codes. The date and/or time value is used as an index into the file to obtain an authentication code. As an example, the authentication code file may contain 365 entries, one for each day of the year. The current day of the year (determined from the current date) may then be used as an index into the file. Those of skill in the art will appreciate that various indexing mechanisms could be substituted and are within the scope of the invention.

Exemplary Computer System

FIG. 3 is a block diagram of a computer system 300 that shows components found in a common computer system such as a server computer capable of supporting various embodiments of the invention. Computer system 300 comprises a processor 302, a system controller 312, a cache 314, and a data-path chip 318, each coupled to a host bus 310. Processor 302 is a microprocessor such as a 486-type chip, a Pentium®, Pentium® II, Pentium® III, Pentium® 4, or other suitable microprocessor. Cache 314 provides high-speed local-memory data (in one embodiment, for example, 512 kB of data) for processor 302, and is controlled by system controller 312, which loads cache 314 with data that is expected to be used soon after the data is placed in cache 314 (i.e., in the near future). Main memory 316 is coupled between system controller 312 and data-path chip 318, and in one embodiment, provides random-access memory of between 16 MB and 256 MB or more of data. In one embodiment, main memory 316 is provided on SIMMs (Single In-line Memory Modules), while in another embodiment, main memory 316 is provided on DIMMs (Dual In-line Memory Modules), each of which plugs into suitable sockets provided on a motherboard holding many of the other components shown in FIG. 3. Main memory 316 includes standard DRAM (Dynamic Random-Access Memory), EDO (Extended Data Out) DRAM, SDRAM (Synchronous DRAM), or other suitable memory technology. System controller 312 controls PCI (Peripheral Component Interconnect) bus 320, a local bus for system 300 that provides a high-speed data path between processor 302 and various peripheral devices, such as graphics devices, storage drives, network interfaces, etc. Data-path chip 318 is also controlled by system controller 312 to assist in routing data between main memory 316, host bus 310, and PCI bus 320.

In one embodiment, PCI bus 320 provides a 32-bit-wide data path that runs at 33 MHz. In another embodiment, PCI bus 320 provides a 64-bit-wide data path that runs at 33 MHz. In yet other embodiments, PCI bus 320 provides 32-bit-wide or 64-bit-wide data paths that run at higher speeds. In one embodiment, PCI bus 320 provides connectivity to I/O bridge 322, graphics controller 327, and one or more PCI connectors 321 (i.e., sockets into which a card edge may be inserted), each of which accepts a standard PCI card. In one embodiment, I/O bridge 322 and graphics controller 327 are each integrated on the motherboard along with system controller 312, in order to avoid a board-connector-board signal-crossing interface and thus provide better speed and reliability. In the embodiment shown, graphics controller 327 is coupled to a video memory 328 (that includes memory such as DRAM, EDO DRAM, SDRAM, or VRAM (Video Random-Access Memory)), and drives VGA (Video Graphics Adaptor) port 329. VGA port 329 can connect to industry-standard monitors such as VGA-type, SVGA (Super VGA)-type, XGA-type (extended Graphics Adaptor) or SXGA-type (Super XGA) display devices.

Other input/output (I/O) cards having a PCI interface can be plugged into PCI connectors 321. Network connections providing video input are also represented by PCI connectors 321, and include Ethernet devices and cable modems for coupling to a high speed Ethernet network or cable network which is further coupled to the Internet. The network connections may be wired or wireless.

In one embodiment, I/O bridge 322 is a chip that provides connection and control to one or more independent IDE or SCSI connectors 324-325, to a USB (Universal Serial Bus) port 326, and to ISA (Industry Standard Architecture) bus 330. In this embodiment, IDE connector 324 provides connectivity for up to two standard IDE-type devices such as hard disk drives, CDROM (Compact Disk-Read-Only Memory) drives, DVD (Digital Video Disk) drives, videocassette recorders, or TBU (Tape-Backup Unit) devices. In one similar embodiment, two IDE connectors 324 are provided, and each provide the EIDE (Enhanced IDE) architecture. In the embodiment shown, SCSI (Small Computer System Interface) connector 325 provides connectivity for up to seven or fifteen SCSI-type devices (depending on the version of SCSI supported by the embodiment). In one embodiment, I/O bridge 322 provides ISA bus 330 having one or more ISA connectors 331 (in one embodiment, three connectors are provided). In one embodiment, ISA bus 330 is coupled to I/O controller 352, which in turn provides connections to two serial ports 354 and 355, parallel port 356, and FDD (Floppy-Disk Drive) connector 357. At least one serial port is coupled to a modem for connection to a telephone system providing Internet access through an Internet service provider. In one embodiment, ISA bus 330 is connected to buffer 332, which is connected to X bus 340, which provides connections to real-time clock 342, keyboard/mouse controller 344 and keyboard BIOS ROM (Basic Input/Output System Read-Only Memory) 345, and to system BIOS ROM 346.

Conclusion

Systems and methods for generating an authentication code associated with a diagnostic code been described above. Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computerized method for authenticating a diagnostic code, the method comprising:
   receiving a diagnostic code generated by a computer system for a component of the computer system; and
   generating an authentication code for the generated diagnostic code; and
   associating the authenticating code with the diagnostic code for the component of the computer system.

2. The computerized method of claim 1 wherein generating the authentication code comprises encoding a date value into the authentication code.

3. The computerized method of claim 1 wherein generating the authentication code comprises encoding a serial number into the authentication code.

4. The method of claim 3 wherein the serial number is a computer system serial number.

5. The method of claim 3 wherein the serial number is a serial number for a hardware component of a computer system.

6. The method of claim 1 further comprising receiving a file of valid authentication codes and wherein generating the authentication code comprises selecting the authentication code from the file of valid authentication codes.

7. The method of claim 6, wherein the authentication code is selected according to a date.

8. The method of claim 1, wherein generating the authentication code comprises receiving the authentication code from a server.

9. The computerized method of claim 1 wherein the generating of the authentication code is performed after the receiving of the diagnostic code.

10. The computerized method of claim 1 wherein the authentication code generated is unique to the diagnostic code received.

11. The computerized method of claim 1 wherein a user is incapable of generating the authentication code.

12. The computerized method of claim 1 wherein the authenticating code is generated without user intervention.

13. The computerized method of claim 1 wherein the authentication code is generated by the computer system.

14. The computerized method of claim 1 additionally comprising requesting an authentication code by the computer system after receiving the diagnostic code.

15. The computerized method of claim 1 wherein generating the authentication code is performed in response to receiving the diagnostic code.

16. A computerized system for authenticating a diagnostic code, the system comprising:
   a diagnostic module on a computer system operable to perform a diagnostic on a component of the computer system and to generate a diagnostic code by the performance of the diagnostic; and
   an authentication code generation module on the computer system operable to generate an authentication code associated with the diagnostic code in response to the generation of the diagnostic code by the diagnostic module.

17. The system of claim 16, wherein the authentication code generation module is further operable to retrieve a serial number and encode the serial number into the authentication code.

18. The system of claim 17 wherein the serial number is associated with a computer system.

19. The system of claim 17 wherein the serial number is associated with a component of a computer system.

20. The system of claim 16 wherein the authentication code generation module is further operable to encode a current time into the authentication code.

21. The system of claim 16 wherein the authentication code generation module is further operable to obtain the authentication code from an authentication code server.

22. A computer-readable medium having computer executable instructions for performing a method for authenticating a diagnostic code, the method comprising:
   receiving a diagnostic code generated by a computer system for a component of the computer system;
   generating an authentication code in response to receiving the diagnostic code; and
   associating the authentication code with the diagnostic code.

23. The computer-readable medium of claim 22, wherein generating the authentication code comprises encoding a date value into the authentication code.

24. The computer-readable medium of claim 22, wherein generating the authentication code comprises encoding a serial number into the authentication code.

25. The computer-readable medium of claim 24, wherein the serial number is a computer system serial number.

26. The computer-readable medium of claim 24, wherein the serial number is a serial number for a hardware component of a computer system.

27. The computer-readable medium of claim 22, wherein the method further comprises receiving a file of valid authentication codes and wherein generating the authentication code comprises selecting the authentication code from the file of valid authentication codes.

28. The computer-readable medium of claim 27, wherein the authentication code is selected according to a date.

29. The computer-readable medium of claim 22, wherein generating the authentication code comprises receiving the authentication code from a server.

\* \* \* \* \*